United States Patent
Dubois et al.

(10) Patent No.: US 8,956,508 B2
(45) Date of Patent: Feb. 17, 2015

(54) METHOD FOR PRODUCING HYDROGEN PEROXIDE

(75) Inventors: Jean-Luc Dubois, Millery (FR); Markus Brandhorst, Lyons (FR); Daniel Bianchi, Lyons (FR); Frederic Thevenet, Saint Priest (FR)

(73) Assignees: Arkema France, Colombes (FR); Centre National de la Recherche Scientifique, Paris (FR); Universite Claude Bernard Lyon 1, Villeubanne (FR)

( * ) Notice: Subject to any disclaimer, the term of this patent is extended or adjusted under 35 U.S.C. 154(b) by 405 days.

(21) Appl. No.: 13/125,461

(22) PCT Filed: Oct. 27, 2009

(86) PCT No.: PCT/FR2009/052059
§ 371 (c)(1),
(2), (4) Date: Jul. 22, 2011

(87) PCT Pub. No.: WO2010/049634
PCT Pub. Date: May 6, 2010

(65) Prior Publication Data
US 2011/0272274 A1 Nov. 10, 2011

(30) Foreign Application Priority Data
Oct. 28, 2008 (FR) ...................... 08 57309

(51) Int. Cl.
*C01B 15/01* (2006.01)
*C01B 15/029* (2006.01)
*H05H 1/24* (2006.01)

(52) U.S. Cl.
CPC ............. *C01B 15/0295* (2013.01); *H05H 1/24* (2013.01)
USPC . 204/175; 422/186; 422/186.03; 422/186.18; 422/186.21

(58) Field of Classification Search
CPC .............................. H05H 1/24; C01B 15/0295
USPC ................ 204/175; 422/186, 186.03, 186.18, 422/186.21
See application file for complete search history.

(56) References Cited

U.S. PATENT DOCUMENTS

| 1,904,101 | A | * | 4/1933 | Taylor et al. .................. 204/175 |
| 2,022,650 | A | | 12/1935 | Dawsev |
| 2,162,996 | A | | 6/1939 | Dawsev |
| 5,194,242 | A | | 3/1993 | Paoli |
| 5,641,467 | A | | 6/1997 | Huckins |
| 2006/0257280 | A1 | * | 11/2006 | Hammerstrom et al. ......... 422/4 |
| 2008/0299034 | A1 | * | 12/2008 | De Frutos Escrig et al. . 423/584 |

FOREIGN PATENT DOCUMENTS

| FR | 643127 | 9/1928 |
| FR | 36087 E | 4/1930 |
| WO | WO 2008/025917 | 3/2008 |

OTHER PUBLICATIONS

Moringa, K., The Reaction of Hydrogen and Oxygen through a Silent Electric Discharge I. The Formation of Hydrogen Peroxide, Bull. Chem. Soc. JP, vol. 35, No. 2, 1962, pp. 345-348.

Dodet, B., et al., Hydrogen Peroxide Formation by Discharge in Argon/Water Vapor Mixtures at Atmospheric Prerssure, J. Adv. Oxid. Technol., vol. 8, No. 1, 2005. pp. 91-97.

Zhou, J., et al., Direct and Continous Synthesis of Concentrated Hydrogen Peroxide by the Gaseous reaction of H2/O2 Non-Equilibrium Plasma, Chem. Commun, 2005, pp. 1631-1633.

* cited by examiner

*Primary Examiner* — Xiuyu Tai
(74) *Attorney, Agent, or Firm* — Steven D. Boyd

(57) ABSTRACT

The present invention relates to a method for preparing an aqueous solution of hydrogen peroxide from oxygen, hydrogen and optionally water. The invention more particularly relates to a method for preparing an aqueous solution of hydrogen peroxide in which at least a portion of the reactor is cooled down to a temperature lower than 15° C.

7 Claims, 1 Drawing Sheet

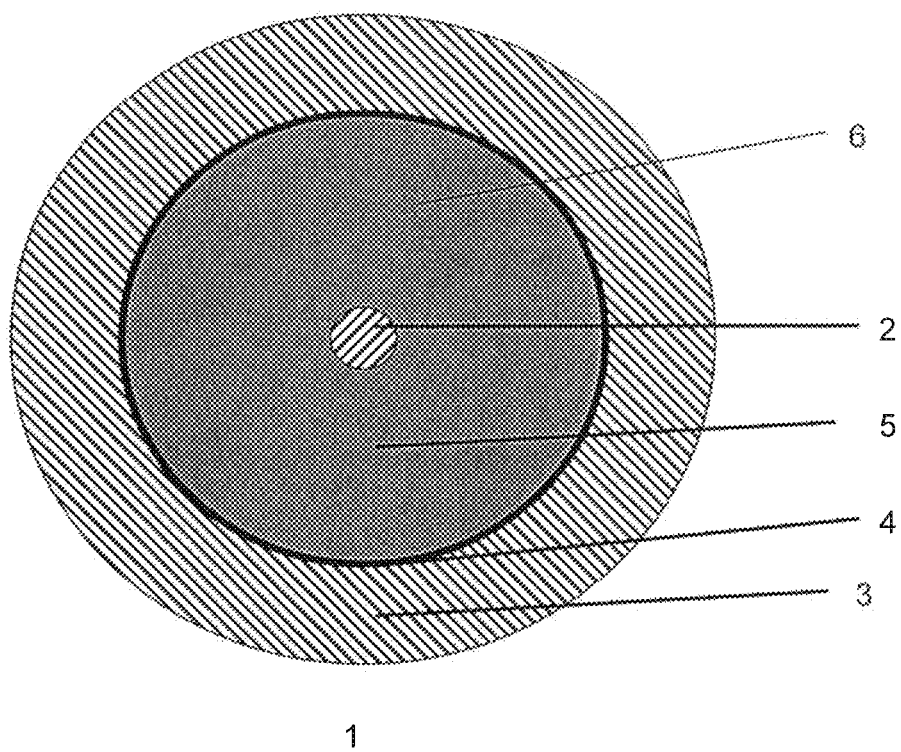

METHOD FOR PRODUCING HYDROGEN PEROXIDE

FIELD OF THE INVENTION

The present invention relates to a process for the preparation of a hydrogen peroxide solution. A subject matter of the present invention is more particularly a process for the preparation of a hydrogen peroxide solution in which a mixture comprising hydrogen and oxygen is activated in a reactor of cold plasma type.

STATE OF THE ART

Hydrogen peroxide is manufactured industrially according to a process based on the technique of auto-oxidation of an anthraquinone derivative comprising a stage (a) of catalytic hydrogenation, in a hydrogenator, of a working solution comprising at least one anthraquinone derivative in solution in at least one organic solvent; followed by a stage (b) of oxidation, in an oxidizer, of the hydrogenated working solution by means of an oxygen-comprising fluid, in particular by means of air, and by a stage (c) of separation by water, in an extractor, of the hydrogen peroxide and of the oxidized working solution and, finally, a stage (d) of recycling, to the hydrogenator, the oxidized working solution recovered in (c).

The direct synthesis of an aqueous hydrogen peroxide solution in a stirred reactor has been studied. The reactor generally comprises an aqueous or organic region, occupied by the working solution (generally acidic aqueous solution) and the catalyst, and a region, occupied by the gases, lying above the aqueous region. The reactor is equipped with a stirrer system which makes it possible both to stir the aqueous region and to disperse the gases in the aqueous phase. This direct synthesis requires operating at high pressure.

In addition to the stirred reactor, the proposal has been made to carry out the direct synthesis of hydrogen peroxide in a tubular reactor composed of a very long tube filled with working solution, in which the catalyst is suspended, and the gaseous oxygen and the gaseous hydrogen are injected in the form of small bubbles in proportions above the lower flammability limit of the hydrogen/oxygen mixture (U.S. Pat. No. 5,194,242). The safety of such a process is ensured only on condition of keeping the gaseous reactants in the reactor in the form of small bubbles. According to the document U.S. Pat. No. 5,641,467, the latter can only be obtained with a high rate of circulation of the working solution.

It is also known to react hydrogen and oxygen at atmospheric pressure using an electrical discharge in a non-equilibrium plasma, better known under the name "cold plasma" (B. K. Morinaga, Bull. Chem. Soc. Jp., 1962, 32, p. 345). More recently, J. Zhou et al. (Chem. Commun., 2005, p. 1631-1633) have activated the gas mixture composed of hydrogen and oxygen at ambient temperature using a dielectric barrier discharge system.

Furthermore, the study by B. Dodet et al. (J. Adv. Oxid. Technol., Vol. 8, No. 1, 2005) relates to the preparation of hydrogen peroxide in a phase after discharge of a barrier electrical discharge system at atmospheric pressure and ambient temperature in a medium comprising oxygen, argon and water vapor.

A description is given, in application WO2008/025917, of a process for the manufacture of hydrogen peroxide by activation, by cold plasma, of a mixture composed of water, oxygen and argon.

U.S. Pat. No. 2,022,650 relates to a process for the manufacture of hydrogen peroxide carried out in the vicinity of ambient temperature, the temperature of the gases being from 15 to 25° C. The reactor is not cooled and, with all the more reason, no part of the reactor is at a temperature below 15° C.

Cold plasma is generally associated with a gaseous medium ionized at low temperature and atmospheric pressure. The cold plasma is produced in an enclosed chamber ("cold plasma reactor"), generally at atmospheric pressure or at a lower or higher partial vacuum, into which the "plasmagen" gas is introduced, to which energy is transferred via a controlled electrical discharge. The plasmagen gas can be a mixture which can be easily ionized, thus becoming electrically conducting. With regard to the electrical discharge, it is obtained either between two electrodes (discharge under an electric field, luminescent at low pressure or corona at atmospheric pressure) or by an electrodeless device under a variable electromagnetic field of high frequency type (for example at 13.56 MHz) or microwave type (for example, 2.45 GHz).

However, these manufacturing processes exhibit an inadequate manufacturing yield and/or a low selectivity for hydrogen peroxide, which has, to date, prevented the industrial use of this process.

SUMMARY OF THE INVENTION

A subject matter of the invention is a process for the manufacture of hydrogen peroxide comprising a stage during which a gas mixture comprising dihydrogen (hereinafter hydrogen) and dioxygen (hereinafter oxygen) is activated in a cold plasma reactor, in which stage at least a part of the reactor is cooled to a temperature of less than 15° C., more preferably within the range extending from −14 to 14° C., very preferably from −10 to 10° C.

Surprisingly, the manufacturing process according to the invention makes it possible to obtain an aqueous hydrogen peroxide solution with a good yield and/or a good selectivity.

The reactor can advantageously comprise water, it being possible for this water to be placed in the liquid form at the bottom of the reactor or to be injected in the form of water vapor.

Advantageously, the specific energy used with regard to the gas in the plasma reactor in order to activate it is within the range extending from 125 to 3000 J/l.

Preferably, the cold plasma reactor is a discharge plasma reactor with electrodes. Preferably, the discharge plasma reactor with electrodes is a dielectric barrier discharge plasma reactor. According to one embodiment, the dielectric barrier discharge plasma reactor is an electrode comprising a jacket within which circulates a solution cooled to a temperature of less than 15° C.

According to the invention, the reactor preferably comprises a weakly conducting solid in the form of a powder, grains or fibers, preferably quartz fibers. Preferably, the plasma region is partially or completely filled with this solid.

According to the invention, the composition of the gas mixture introduced during the activation stage preferably has a hydrogen content of less than 3.2% by volume or an oxygen content of less than 5% by volume.

The risk of explosion in the plasma reactor is avoided within this range of compositions.

DESCRIPTION OF THE APPENDED FIGURE

FIG. 1 exhibits a transverse cross section of an example of a corona cold plasma reactor (1), that is to say a reactor comprising a cylindrical electrode. A central electrode (2) is connected to the high voltage plasma generator situated outside the reactor. A cylindrical counterelectrode (3) is placed all around the central electrode: the plasma region (5), that is to say the region in which the plasma is activated, is found between the central electrode and the inner surface (4) of the cylindrical counterelectrode. A weakly conducting solid (6) is in the plasma region.

DETAILED DESCRIPTION OF THE INVENTION

A subject-matter of the invention is a process for the manufacture of hydrogen peroxide comprising a stage during which a gas mixture comprising hydrogen and oxygen is activated in a cold plasma reactor, in which stage at least a part of the reactor is cooled to a temperature of less than 15° C., more preferably within the range extending from −14 to 14° C., very preferably from −10 to 10° C., for example from −3 to 3° C. The temperature can be greater than −15° C., for example greater than 0° C.

When the entities are activated in the plasma reactor, a mixture of water and hydrogen peroxide is mainly formed.

The gas mixture introduced comprises oxygen, hydrogen and optionally water vapor. This mixture can also comprise any other type of gas, such as, for example, an inert gas, such as argon or helium.

Advantageously, the gas mixture can be cooled using a heat exchanger before it is introduced into the plasma reactor.

The cold plasma reactor can be any type of reactor capable of creating a plasma from the mixture of oxygen and hydrogen introduced. Plasma reactors of electromagnetic type (that is to say, electrodeless plasma reactors) can be used, for example microwave or high frequency plasma reactors. Electrical discharge plasma reactors with electrodes can also be used, for example those comprising an electric field, comprising a luminescent discharge, comprising a corona discharge or dielectric barrier discharges.

Use is advantageously made of a reactor with electrodes. Preferably, it is a dielectric barrier discharge reactor.

In order to form the dielectric barrier, a weakly conducting material is placed between the electrodes. The term "weakly conducting solid" is understood to mean, in the present patent application, a solid exhibiting an electrical conductivity of less than $10^{-2}$ S·m$^{-1}$, preferably of between $10^{-22}$ and $10^{-5}$ S·m$^{-1}$. This material must not decompose under the effect of the plasma.

The electrode or electrodes can thus be covered with a sheath made of glass, for example of "Pyrex®" type, of quartz or of silica. According to an alternative form, the weakly conducting material can be deposited directly on the electrode or electrodes, for example by an impregnation and deposition technique. For example, silicon oxide ($SiO_2$) or metal oxides, such as aluminum oxide ($Al_2O_3$) or titanium oxide ($TiO_2$), can be deposited on the electrodes. Very preferably, the two electrodes are covered with a dielectric barrier.

The hydrogen peroxide yield is improved when at least one electrode is covered with the weakly conducting material, in comparison with the case where no electrode is covered with it.

A part of the reactor can be cooled by any known means, for example by using a heat exchanger.

According to one embodiment, when the plasma is an electrical discharge plasma with electrodes, the part of the reactor which is cooled is at least one of the electrodes. In the case where the plasma is a dielectric barrier discharge plasma, it is possible, for example, to use an electrode comprising a glass jacket in which a solution, preferably a saline solution, circulates, which makes it possible to cool a part of the reactor. This solution is cooled to a temperature of less than 15° C., more preferably within the range extending from −14 to 14° C., very preferably from −10 to 10° C., for example from −3 to 3° C. The temperature can be greater than −15° C., for example greater than 0° C. The saline solution can advantageously have a concentration within the range extending from 5 to 100 g/l. Preferably, the saline solution is an aqueous NaCl solution.

Advantageously, the specific energy used with regard to the gas in the plasma reactor in order to activate it is within the range extending from 125 to 3000 J/l.

The specific energy ($E_{sp}$) is given using the following relationship:

$$E_{sp}=P/Q$$

with P representing the power applied by the plasma generator and Q representing the flow rate of the mixture of the gases inside the reactor.

Advantageously, the cold plasma reactor can comprise, in the plasma region, a weakly conducting solid in the form of a powder, grains or fibers. Preferably, the specific surface of the weakly conducting solid is advantageously greater than 0.1 m$^2$/g, preferably within the range extending from 1 to 100 m$^2$/g. In the context of the present patent application, the specific surface is measured by the BET method in the paper by S. Brunauer, P. H. Emmett and E. Teller, *Adsorption of Gases on Multimolecular Layers*, in the Journal of the American Chemical Society, 1938, 60, pages 309-319. Preferably, the weakly conducting solid is chosen from quartz fibers or glass fibers. A layer of silicon oxide ($SiO_2$) or of metal oxides, such as aluminum oxide $Al_2O_3$) or titanium oxide ($TiO_2$), can advantageously be deposited on these quartz fibers.

Advantageously, the pressure inside the reactor during the stage of activation by plasma is included within the range extending from 0.001 to 1 MPa, preferably atmospheric pressure.

The hydrogen peroxide can be recovered in the gaseous form and/or in the form of an aqueous solution in the reactor when it has condensed. In the case where the hydrogen peroxide is recovered in the gaseous fashion, it can be condensed using a cooler at the reactor outlet. In the case where the aqueous hydrogen peroxide solution is condensed in the reactor, it can be withdrawn continuously or batchwise.

The unreacted background gases are advantageously recovered at the outlet of the reactor in order to be reinjected.

The invention also relates to the hydrogen peroxide obtained directly by the process according to the invention.

The process according to the invention makes it possible to obtain hydrogen peroxide solutions with an excellent yield and a very good selectivity.

The following example illustrates the advantages of the present invention, without implied limitation.

Example

The reactor used for the manufacture of hydrogen peroxide is a vertical corona discharge reactor, such as described in FIG. 1, equipped with a system of 2 dielectric barriers made of Pyrex® glass on each of the electrodes. The central electrode, made of copper, is covered with a sheath of Pyrex® glass (1st dielectric barrier) and is connected to the high-voltage generator. The counterelectrode, which is connected to ground, is a jacketed electrode made of Pyrex® glass (2nd dielectric barrier) in which circulates an NaCl solution with a concentration set at 20 g/l. This saline solution is thermostatically controlled. The plasma region has a height of 170 mm, with an interelectrode distance of 2.5 mm. The plasma region is filled with nonwoven quartz fibers formed of quartz covered with TiO$_2$ having a specific surface of 40 m$^2$/g. The gas mixture is introduced continuously at the top of the reactor. The gas mixture has an excess of hydrogen and has the composition 97.75 vol % of hydrogen and 2.25 vol % of oxygen. It is introduced using Brooks 5850-S flow meters. The specific energy applied to the gas in order to form the plasma is 500 J/l. After passing through the plasma region, the hydrogen peroxide and the water are recovered after passing through a condenser at the bottom of the reactor.

The number of moles of hydrogen peroxide thus formed is quantitatively determined according to the titrimetric method described in the document "CEFIC PEROXYGENS H$_2$O$_2$ AM-7157". The background gas is also quantitatively determined using a mass spectrometer in order to determine the number of moles of residual oxygen; the amount of oxygen consumed can thus be determined.

The yield of and the selectivity for hydrogen peroxide are calculated in the following way:

Yield=number of moles of H$_2$O$_2$ collected/number of moles of O$_2$ introduced, Selectivity=number of moles of H$_2$O$_2$ collected/number of moles of O$_2$ consumed.

The yields and the selectivities as a function of the temperature of the counterelectrode thermostatically controlled by the saline solution are given in table 1.

TABLE 1

| Temperature (° C.) | Yield (%) | Selectivity (%) |
|---|---|---|
| 5 | 7.57 | 61.52 |
| 7 | 4.37 | 35.45 |
| 10 | 3.40 | 27.72 |
| 14 | 0.73 | 6.58 |
| 20 | 0.05 | 0.55 |
| 30 | 0.02 | 0.27 |
| 40 | 0.02 | 0.17 |
| 50 | 0.01 | 0.11 |

What is claimed is:

1. A process for the manufacture of hydrogen peroxide comprising activating a gas mixture comprising hydrogen and oxygen wherein said gas mixture comprises a hydrogen content of less than 3.2% by volume or an oxygen content of less than 5% by volume in a cold plasma reactor comprising one or more electrodes, sheathed with a material selected from glass, quartz or silica and containing a weakly conducting solid in the form of a powder, grains or fibers having a conductivity less than about 10$^{-2}$ S/m, characterized in that at least a part of the reactor is cooled to a temperature of less than 10° C. wherein the yield of hydrogen peroxide is about 3% or greater at a selectivity of about 27% or greater.

2. The process as claimed in claim 1, characterized in that the gas mixture comprises water vapor.

3. The process as claimed in claim 1, further characterized in that a specific energy is applied to the gas mixture in the reactor within the range extending from 125 to 3000 J/l.

4. The process as claimed in claim 1, characterized in that the cold plasma reactor is a discharge plasma reactor.

5. The process as claimed in claim 4, characterized in that the discharge plasma reactor is a dielectric barrier discharge plasma reactor.

6. The process as claimed in claim 5, characterized in that the dielectric barrier discharge plasma reactor comprises an electrode comprising a jacket within which circulates a solution cooled to a temperature of less than 10° C.

7. The process of claim 1 characterized in that the fibers are quartz fibers.

* * * * *